Aug. 27, 1929.   E. M. ASHWORTH   1,726,331
ELECTRIC METER
Filed Oct. 25, 1923   3 Sheets-Sheet 1

Inventor
E. M. Ashworth

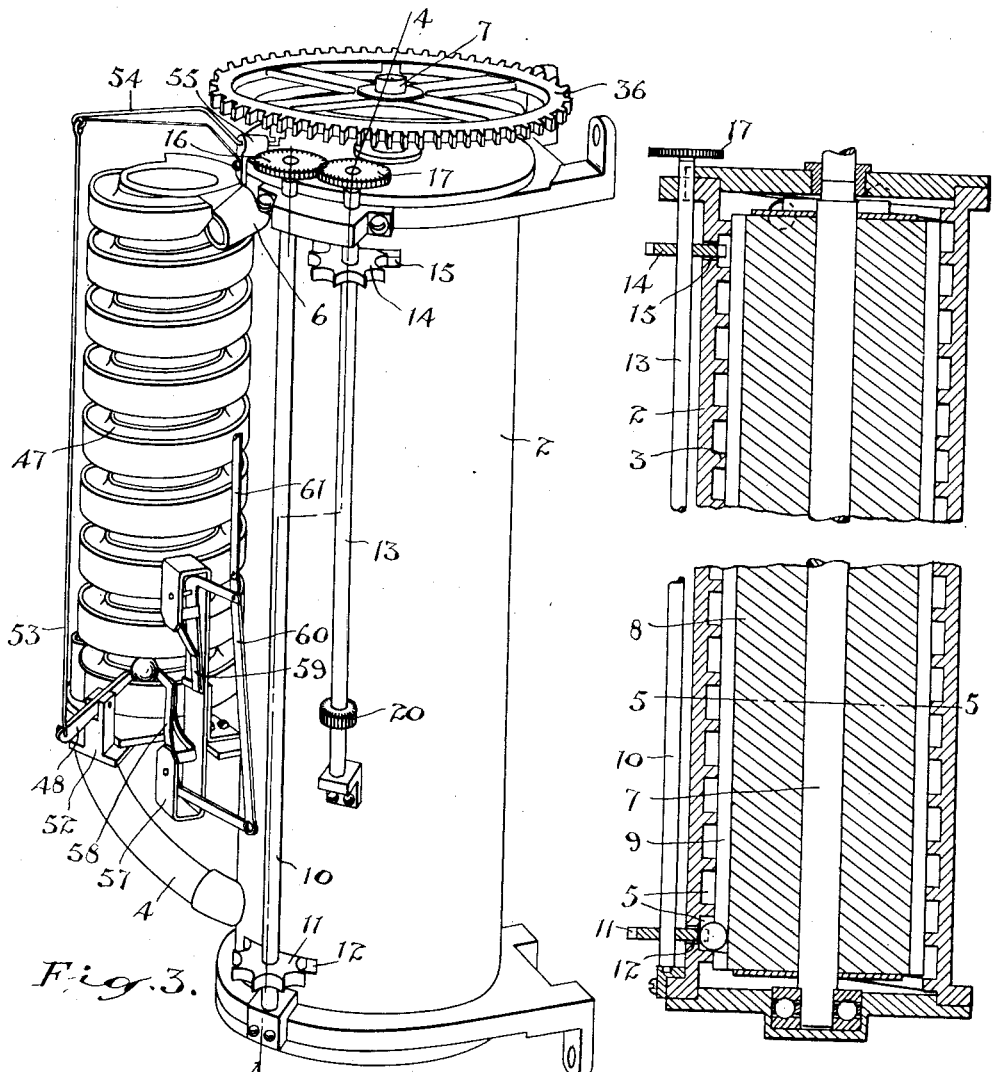

Aug. 27, 1929.    E. M. ASHWORTH    1,726,331
ELECTRIC METER
Filed Oct. 25, 1923    3 Sheets-Sheet 3

Inventor
E. M. Ashworth
by H. J. S. Dennison
Atty.

Patented Aug. 27, 1929.

1,726,331

UNITED STATES PATENT OFFICE.

EDWARD M. ASHWORTH, OF TORONTO, ONTARIO, CANADA.

ELECTRIC METER.

Application filed October 25, 1923. Serial No. 670,800.

The principal objects of the invention are to obtain an accurate record of the maximum demand or peak load of current used in order that the charge for current may be made upon a proper basis.

The established conditions in connection with the sale of electric current require that a record be made of the largest amount of current used within a given time in order that the peak load may be shown, as it is the peak load that regulates the supply, that is to say, the supply must always be equal to the demand of the peak load and therefore the charges must be based thereon.

The present invention has been devised to effect an indication and retain a record of the maximum demand during any interval of predetermined length and the principal feature of the invention consists in the novel manner of controlling the delivery of indicating units by an integrating meter governing an electrical control, thereby enabling the use of two separate elements in the form of an integrating meter and the demand meter, the integrating meter being arranged in an electrical circuit operating a positive mechanical control of the indicating units.

In the accompanying drawings, Figure 1 is an elevational view of my improved demand meter.

Figure 3 is an enlarged perspective detail of the mechanical device for handling the indicating units.

Figure 1:
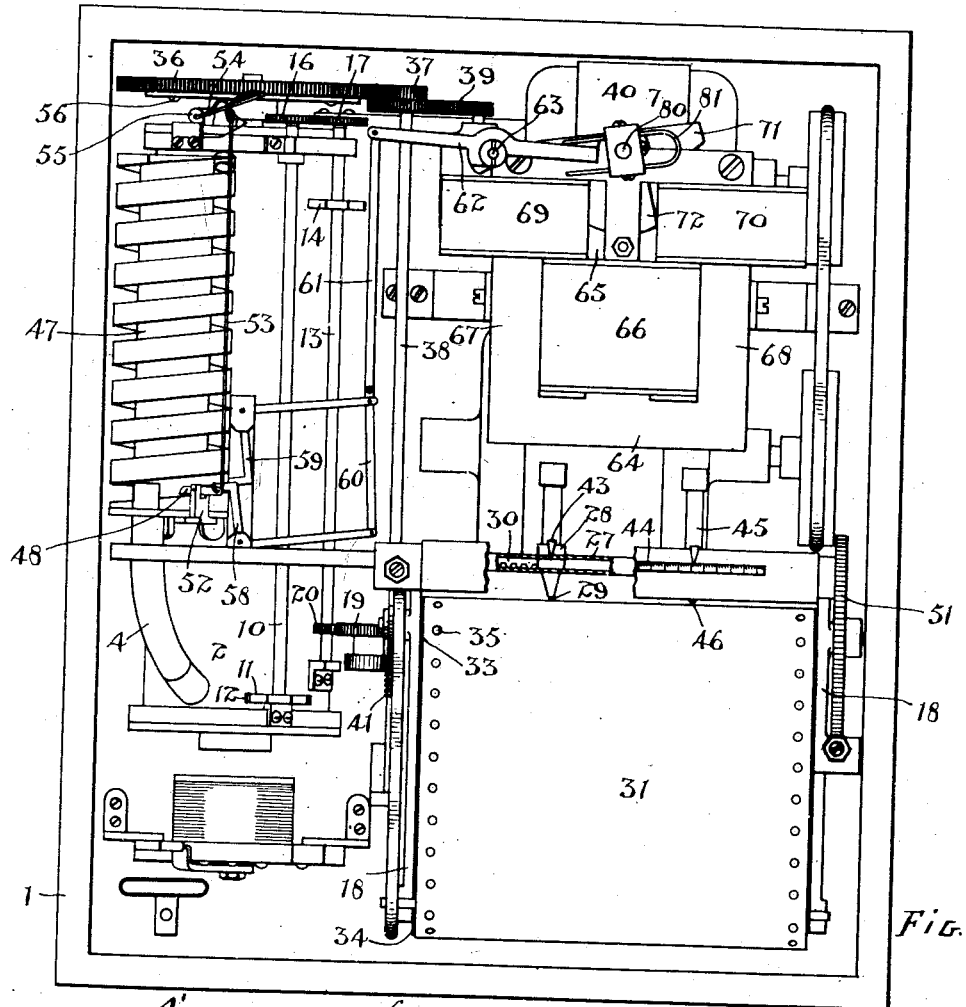
Figure 2:
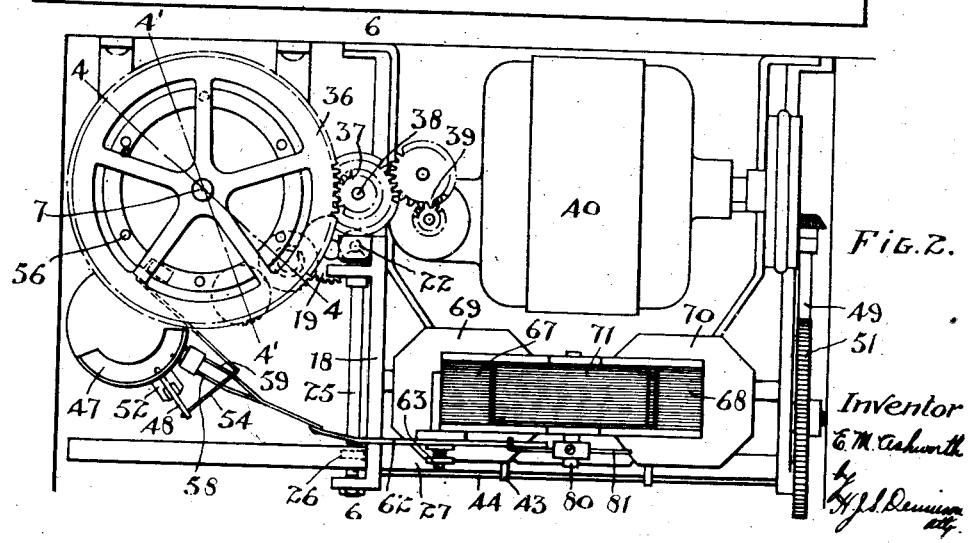
Figure 2 is a plan view from the top of the meter shown in Figure 1.

Figure 4 is an enlarged vertical sectional view taken partly through the line 4—4 and partly through the line 4'—4' of Figures 2 and 3.

Figure 5 is a cross sectional view of the cylinder member shown in Figure 3 taken on the line 5—5 of Fig. 4.

Figure 6:
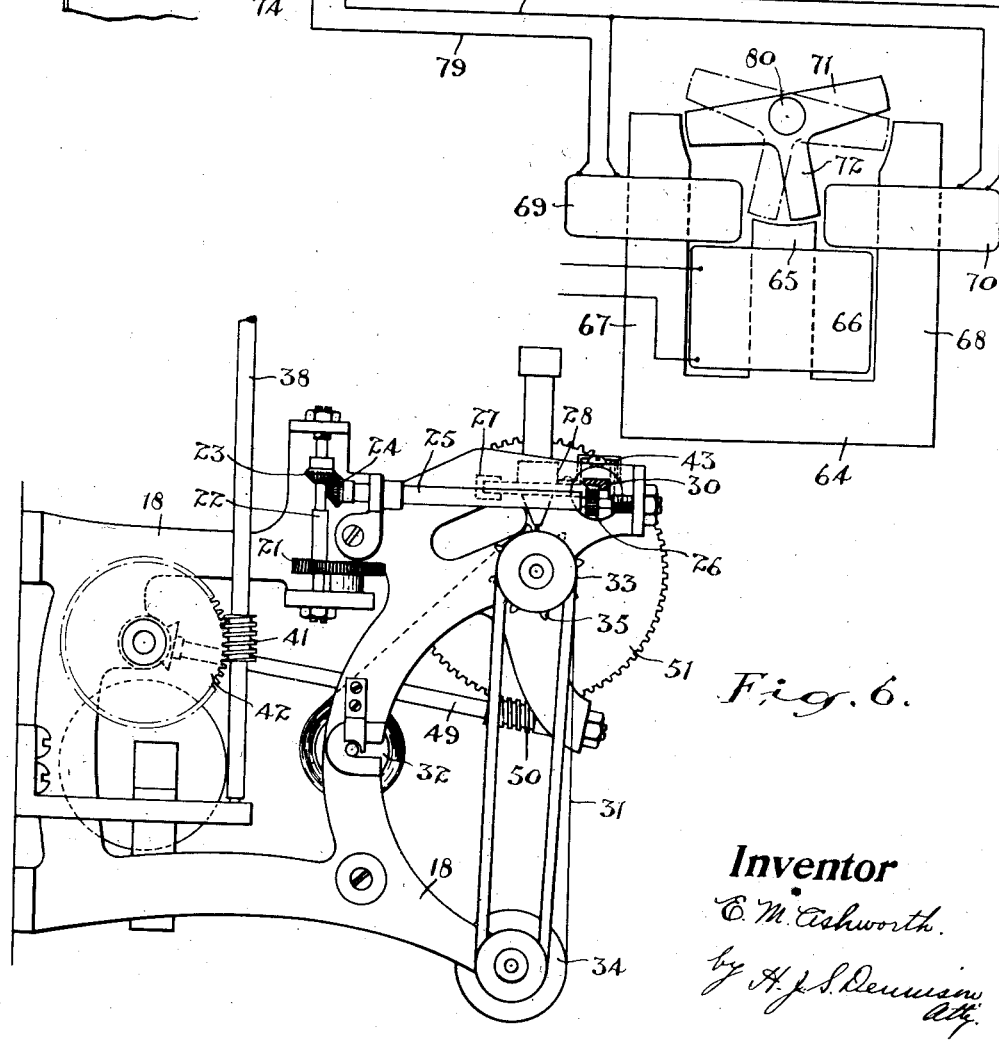

Figure 6 is an enlarged end elevational view of the recording mechanism taken on the line 6—6 of Figure 2.

Figure 7:
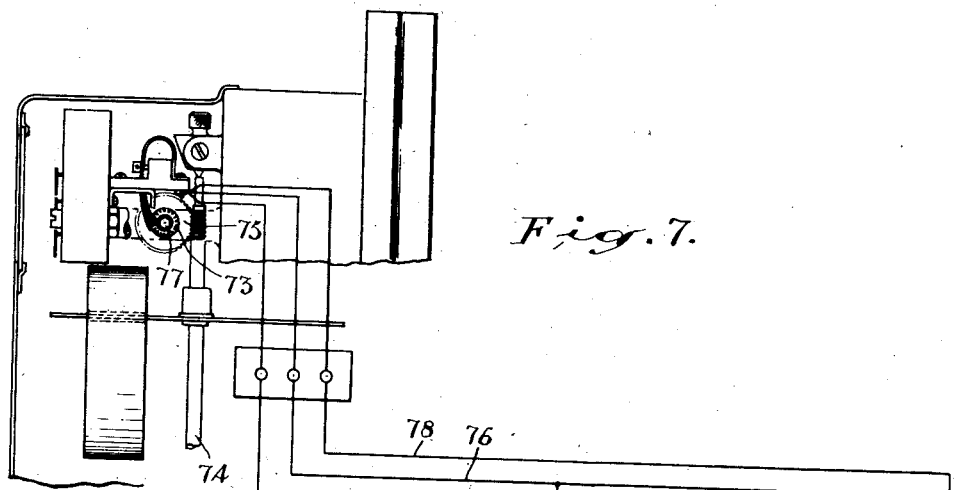

Figure 7 is a diagrammatic illustration of the wiring connections from the integrating meter to the recording meter control.

The demand meter construction comprises a casing 1 to the back of which is secured a cylindrical casing 2, the inner wall of which is formed with a spiral flange 3 extending from the bottom to the top thereof.

A tubular duct 4 leads to the bottom of the casing 2 into the groove 5 formed between the members of the spiral flange and a tube 6 leads from an opening in the side wall of the casing 2 at the top.

A spindle 7 is journalled in suitable bearings in the bottom and top of the cylinder and on this spindle is mounted a cylindrical member 8 which is formed with a plurality of longitudinal grooves 9 extending from end to end thereof. The space between the inner wall of the casing 2 and the bottom of the grooves 9 is such as to loosely accommodate a steel ball of a certain diameter and balls fed in through the lower tube 4 will drop into the grooves 9 and by the rotation of the cylinder 8 these balls are caused to travel up a spiral flange, being carried around by the cylinder until upon reaching the top the balls are discharged through the tube 6.

A spindle 10 is journalled in suitable bearings at the outside of the cylinder 2 and upon this spindle is mounted a pocket wheel 11. This wheel extends through a slot 12 in the casing 2 adjacent to the bottom so that the balls engaged by the cylinder 8, will, in rotation, engage the pocket wheel and turn the spindle 10.

A similar spindle 13 is supported in suitable bearings and carries a pocket wheel 14 adjacent to the top, said pocket wheel extending through a slot 15 so that the balls carried upward by the rotation of the cylinder 8 will engage the wheel.

The spindles 10 and 13 are provided with intermeshing spur gears 16 and 17 at the top ends.

By thus connecting the two spindles it will be seen that when a ball operates the lower pocket wheel the spindle will be turned and through the gear connection at the top the spindle 13 will be rotated in the opposite direction to the spindle 10. Then when a ball engages the pocket wheel 14 the spindle will be rotated in the same direction as the spindle 10 is rotated by the action of the balls but the spindle 10 will then be rotated in a reverse direction. The grooves 9 are so spaced that the pocket wheels 11 and 14 cannot both be engaged by balls at the same time.

Arranged adjacent to the cylinder 2 within the casing 1, is a recording device carried upon the frame structures 18 and mounted upon the frame adjacent to the cylinder 2 is a spur gear 19 which meshes with a spur pinion 20 arranged upon the spindle 13. The motion of the spindles actuated by the balls is thus transmitted to the gear 19. This gear meshes with a pinion 21 secured to a vertical spindle 22 mounted in the frame 18.

The spindle 22 is provided with a bevelled pinion 23 meshing with a bevelled pinion 24 on a horizontally arranged shaft 25 carried on the frame 18. On this shaft 25 is mounted a spur pinion 26.

A pair of horizontally arranged channel guides 27 extend between the frames 18 and a block 28 slidably arranged between the guides and carrying a recording pencil 29 has secured to it a rack bar 30 which meshes with the pinion 26 and is operated thereby to travel the pencil in the guides.

A graphic recording sheet 31, mounted on a roller 32 supported in the frames 18, passes over a roller 33 and is wound upon the bottom roller 34, the roller 33 being provided with sprocket teeth 35 to engage perforations in the paper to insure a positive movement thereof.

The pencil 29 rests upon the sheet and records thereon the movement of the rack as affected by the movement of the spindles 10 and 13.

The feed of the graphic sheet 31 is accurately timed with the movement of the cylinder 8.

The spindle of the cylinder 8 has secured to its upper end a spur gear wheel 36. This spur gear meshes with the spur pinion 37 carried on a vertical shaft 38, which shaft is driven by a train of gears 39 operated by a synchronous motor 40 which may be of any suitable design and which operates at a uniform rate of speed.

The worm 41 arranged on the vertical shaft 38 meshes with the worm wheel 42 which operates a driving connection to the roller 33 carrying the graphic sheet.

The operating connection is effected through a shaft 49 carrying a worm 50 meshing with the gear wheel 51 on the end of the shaft of the top roller 33.

The block 28 carrying the pencil 29 is provided with a pointer arm 43 which extends over a gauge 44 supported on the frame structure 18. A second block 45 is arranged in the guide 27 and carries a pencil 46. This pencil traces a straight line on the chart except when the block 28 may be moved to engage the block 45. The second pencil is then pushed further over on the scale and a break is made in the straight line. This is a very great assistance to the reading of the chart, in that it is merely necessary to follow the line traced by the free pencil and to locate the breaks occurring therein, which thereby indicate period of the peak load.

A certain definite number of balls are utilized in the operation of the meter and these are arranged in a spiral track 47, being fed thereinto at the top from the tube 6 leading from the top of the cylinder 2 and directing the balls into the tube 4 leading to the bottom of the cylinder.

The balls on the run-way are held from passing into the duct 4 by means of a finger 48 pivotally supported on a bracket 52. The finger is operated to tilt downwardly to release the balls at predetermined periods by a rod 53 connected to a crank arm 54 supported in a bearing 55, arranged on the top of the cylinder 2. The inner end of this crank arm is engaged by an arrangement of protuberances 56 on the underside of the gear wheel 36. These protuberances are so arranged as to operate the finger to allow the balls to pass down the duct 4, at periods when the blank portions of the grooved cylinder 8 between the grooves 9 are opposite to the point of entrance. The finger obstructs the balls to prevent their rolling down the duct 4 when the grooves are passing the point of entrance so as to obviate the possibility of the balls becoming jammed between the edge of the groove and the side of the entrance.

If the balls are allowed to roll down the duct when the solid portion of the cylinder 8 closes the entrance, they will readily slip into the grooves as the grooves come into register with the opening and there will be no danger of fouling.

A bracket support 57 carries a pair of pivotal fingers 58 and 59 spaced apart and adapted to enter the run-way to obstruct the balls. Each of these fingers has a bell crank extension connected by a link 60 so that when one finger projects into the run-way the other one will be clear of the balls.

In the position of these fingers, as illustrated in Figure 3, the lower finger extends into the run-way and will stop balls. When the position of the fingers is reversed, the upper finger passes behind the lowermost ball held by the lower finger and the lower finger is then drawn back. The device thus forms an escapement, releasing one ball at a time.

The link 60 has connected to its upper end a link 61 suspended from a rocker arm 62 supported on a rigid pivot 63.

An electro-magnet 64 is rigidly supported in the casing 1 and the core thereof is formed with a central member 65 on which is wound the coil 66 connected with an alternating current circuit. The core is extended to form the two side arms 67 and 68 and on each of these side arms are arranged the coils 69 and 70.

An armature 71 is pivotally mounted between the ends of the arms 67 and 68 and the central member 65, said armature having a depending leg 72 extending into close proximity to the central member 65 of the magnet.

The main section of the armature extends between the side arms 67 and 68 so that when one end is arranged in close association with one arm of the core, the other will be raised therefrom.

The armature will remain stationary on its pivot support so long as the magnetic flux remains constant, but I provide means for impeding or checking this flux through the medium of the coils 69 and 70. If the coils 69 and 70 are open there will be no impeding of the magnetic flux in either outside arm of the core but if the winding of one of these coils is closed, that of the other being open, the result will be that the magnetic flux will be choked in the arm of the core bearing the closed coil and increased in the arm of the core bearing the open coil, and this will cause the armature to tilt toward the open coil. If the windings of the two coils are alternately closed and opened so that one coil is opened before the other is closed the armature will tilt on its pivot alternately in one direction and then in the other.

This effect is produced by connecting the open end of the coils 69 and 70 through a commutator 73. This commutator is contained within the structure of an ordinary integrating meter as partially illustrated in Figure 7, the spindle 74 of the meter operating the worm wheel 75 to turn the segmental member 73.

The common wire 76 leads to a brush 77 engaging a common contact ring but the wires 78 and 79 connect to brushes engaging the segmental contacts so that as the commutator rotates, the coils will be closed alternately. Upon the closing of the coils they become secondaries to the primary winding of the magnet and they thus form an impedance to the magnetic flow to the armature and as the opposite arm of the magnet is not choked, the magnetic flux will swing the armature on its pivot.

As long as the current continues to flow through the integrating meter an alternate making and breaking of the contacts to the coils 69 and 70 will continue and the action will be in proportion to the speed of movement of the integrating meter.

The spindle 80 of the armature is provided with a forked member 81 which extends each side of the end of the rocker arm 62 and as the armature rocks on its pivot back and forth, the ends of the forked member will engage the rocker arm 62, operating it on its pivot, thereby operating the escapement previously described to release the balls one at a time.

In the operation of this device, the grooved cylinder 8, rotating at a constant speed, continuously carries the balls arranged in the grooves thereof upward around the spiral flange 3. The speed of the operating motor and the length of the spiral flange are arranged in the desired proportion to carry a ball from the bottom to the top in a certain predetermined period of time.

The ball when first entering the casing 2 through the duct 4, enters one of the grooves 9 in the cylinder and in passing the pocket wheel 11 it turns the said wheel and the shaft connected therewith a portion of a turn.

The spur gear connection between the spindle 10 and the spindle 13 effects the rotation of the spindle 13. Each operating through the train of gears previously described moves the rack carrying the pencil 29 transversely of the graphic sheet. If, for example, the meter is designed to register the "integrated ten-minute peak" the speed of the grooved cylinder 8 is such that a ball passing the pocket wheel 11 at any moment of time will pass the pocket wheel 14 exactly ten minutes later. The gears are so adjusted that when there are no balls in the grooves of cylinder 8 (which is the condition ten minutes or more after the integrating meter has ceased to register load) the pencil 29 will stand on the zero line of the chart. If now a load comes on, a series of balls released by the rotation of the integrating meter will pass the pocket wheel 11 rotating it continuously in one direction and causing the pencil 29 to move steadily to the right for a period of ten minutes until the first of the balls passes the pocket wheel 14, after which the pencil 29 will begin to move alternately to right and left as entering balls pass the pocket wheel 11 and outgoing balls pass the pocket wheel 14. If the load goes to zero the integrating meter will drop, no more entering balls will pass the pocket wheel 11 and the outgoing balls will pass the pocket wheel 14 rotating it continually in one direction so that the pencil 29 will be carried back to zero by the time the last outgoing ball has passed the pocket wheel 14.

By consideration of the above explanation it will be seen that the position of the pencil 29 at any moment shows the number of balls that have passed the pocket wheel 11 and have not yet passed the pocket wheel 14—that is to say the number of balls that have been released by the operation of the integrating meter in the preceding ten minutes. It therefore shows the number of units of electrical energy that have passed through the meter in that period, or in other words the integrated load over that period, and since the registration is continuous the curve thus produced will show when a peak load occurs and its amount.

Whenever the pencil 29 is moved to the right to indicate a new high peak it will push the block 45 towards the right thus causing a break in the straight line traced by the free pencil 46. This is of value in reading the chart, since there are often many peaks of almost the same size registered on a monthly chart, and without such a guide it would be necessary to carefully inspect and compare a large number of such peaks.

In the operation of the electrical control for the feeding of the balls, it is essential that a mechanism be provided that will not be subject to sparking or corrosion.

The oscillator member or armature 71 is operated by short circuiting the coils 69 and 70 alternately, so that when one branch of the magnetic circuit has its coil short circuited the magnetism is driven to the other branch of the circuit by the counter-magnetomotive force of self induction of the short circuited coil. This causes the armature to be pulled into line with the branch of the magnetic circuit into which the magnetic flux is forced.

It will be noted that although one of the coils has considerable flux through it at the moment it is short circuited, there is very little flux through it when it is being open circuited since by that time the armature has been pulled into line with the other branch of the circuit and the branch of the magnetic circuit in which the short circuited coil is left has an air gap of considerable length introduced into it. There is, therefore, no appreciable sparking of the commutator at the time of open circuiting the coil when otherwise the most destructive sparking would take place.

The actual shape of the magnet core and armature may be varied but with the shape shown the magnet may be made from one set of stampings.

What I claim as my invention is:—

1. A device of the kind described having an integrating meter, a supply of indicating units, a carrier adapted to carry the indicating units in relatively spaced relation over a fixed distance, electrical means controlled by the operation of the integrating meter for feeding said indicating units to the carrier, indicating means, and compensating means operatively connected with the indicating means and engaged by said spaced units at definite time intervals during their travel in the carriage.

2. A device of the kind described, having an integrating meter, a supply of indicating units, a spirally grooved member, a member rotatable relative to said spirally grooved member adapted to engage and advance said units in the spiral groove, means for rotating said latter member at a constant speed, electrical means controlled by the operation of the integrating meter for feeding said indicating units to said grooves at one end of the grooved member, indicating means, and compensating means operatively connected with the indicating means extending into the spiral groove at fixed spaced points to be engaged by the units in their advance.

3. A device of the kind described having an integrating meter, a supply of indicating units, a carrier adapted to carry the indicating units in relatively spaced relation over a fixed distance, electrical means controlled by the operation of the integrating meter for feeding said indicating units to the carrier, indicating means, a pocket wheel arranged at one end of said carrier in the path of travel of the units carried thereby and engaging the same in their passage, a pocket wheel arranged at the opposite end of said carrier in the path of travel of the units carried thereby and engaging the same in their passage, said pocket wheels being operatively connected and having their axes parallelly offset, electrical means controlled by the integrating meter for feeding said indicating units to the carrier, and indicating means operatively connected with said pocket wheels.

4. A device of the kind described having an integrating meter, a supply of indicating units, a cylinder having a spiral groove in its inner wall extending from end to end, a cylindrical member rotatably arranged within said cylinder and having a plurality of circumferentially spaced grooves in its periphery extending from end to end adapted to accommodate a portion of each unit to effect their advance in the spiral groove of the cylinder, means for rotating said cylindrical member at a constant pre-determined speed, electrical means controlled by the operation of the integrating meter for feeding said units to said grooves at one end of the cylinder, an indicator, and compensating means operatively connected with said indicator and extending through the wall of said cylinder at each end thereof into said spiral groove to be engaged and actuated by the units in their advance therein.

5. A device of the kind described, having an integrating meter, a supply of indicating units, a spirally grooved member, a member rotatable relative to said spirally grooved member adapted to engage and advance said units in the spiral groove, means for rotating said latter member at a constant speed, means controlled by the operation of the integrating meter for feeding said indicating units to said grooves at one end of the grooved member, a shaft journalled longitudinally of the carrier member having a pocket wheel extending into the spiral groove at one end thereof, a second shaft spaced parallelly from the aforesaid shaft and having a pocket wheel extending into the spiral groove at the opposite end thereof, each of said pocket wheels being adapted to be engaged and actuated by the units in their passage in the spiral groove, gear wheels connecting said shafts to operate in unison, and indicating means operatively connected with one of said shafts.

6. A device of the kind described having an integrating meter, a storage run-way adapted to contain a supply of indicating units, a carrier member arranged adjacent said run-way adapted to receive indicating units from the lower end of said run-way and to elevate the same in relatively spaced relation for a fixed distance and return the same to the storage run-way therebeyond, means for intercepting said units at the lower end of said run-way, an electro-magnet controlling said latter means, a commutator operated by the integrating meter adapted to open and close the magnet circuit, indicating means, and means arranged in spaced relation in the path of movement of the units as they are being elevated for operating said indicating means.

7. In a device of the kind described, an internally grooved spiral cylinder, a longitudinally grooved cylindrical member rotatable within said cylinder, a spur gear secured to said cylindrical member, a constant speed motor operatively connected with said gear to constantly rotate said cylindrical member, a spiral run-way connected with the top of the spiral groove in the cylinder, balls adapted to be carried upward in the groove in the cylinder by the rotatable cylinder member, a duct connecting the lower end of said run-way with the lower end of the groove in said cylinder, electrically controlled means for intercepting the balls in their passage on the run-way, an integrating meter controlling said electrical control, a marker, and means actuated by the passage of balls in the grooved cylinder for operating said marker.

EDWARD M. ASHWORTH.